United States Patent Office 3,672,885
Patented June 27, 1972

3,672,885
FERROCYANIDE-CHELATE CONVERSION SOLUTION FOR ELECTROPHOTOGRAPHIC OFFSET MASTERS
George M. Ort, Chicago, Ill., assignor to A. B. Dick Company, Niles, Ill.
No Drawing. Continuation of application Ser. No. 652,689, July 12, 1967. This application Oct. 23, 1970, Ser. No. 83,629
Int. Cl. G03g 13/00
U.S. Cl. 96—1
9 Claims

ABSTRACT OF THE DISCLOSURE

A conversion solution for zinc oxide coated electrophotographic planographic masters in which the conversion solution depends upon the presence of ferrocyanide in solution therein, in which the improvement comprises the formulation of the conversion solution with a chelating agent that sequesters the $Fe^{++}$ and $Fe^{+++}$ ions present in the solution by reason of the equilibrium reaction of the ferrocyanide whereby the solution is stabilized to minimize deterioration and increase the stability and shelf life thereof.

---

This application is a continuation of applicant's copending application, Ser. No. 652,689, filed July 12, 1967, now abandoned.

This invention relates to the production of copy by electrophotographic technique employing an electrophotographic planographic or offset master and it relates more particularly to compositions capable of being used with such electrophotographic offset masters for the development of a proper balance between the ink repellancy and water receptivity of the non-imaged portions of the master as compared to the water repellency and ink receptivity of the imaged portions of the master.

As described in the copending applications Ser. No. 444,624, filed Apr. 1, 1965, and entitled "Electrophotographic Offset Master and Method of Manufacture," and Ser. No. 449,292, filed Apr. 19, 1965, now U.S. Patent 3,445,229 and entitled "Preparation of Imaged Offset Masters," as well as in issued U.S. Pat. Nos. 2,987,395 and 3,001,872, a master sheet is fabricated of a base sheet of metal, plastics, paper or the like having a photoconductive zinc oxide-resinous binder coating which has the desired photoconductive properties for the development of a latent electrostatic image by the now well known electrostatic techniques. Such images, when developed by suitable ink-receptive water-repellent liquid or powder developers, still require treatment of the imaged surface to convert the non-imaged portions of the master surface to the desired water-receptive, ink-repellent characteristics necessary for a workable image offset or lithographic master. Such solution for treatment is hereinafter referred to as a conversion solution.

For the most part, as in U.S. Pat. No. 3,001,872, such conversion solutions have been formulated with potassium ferrocyanide in solution, either alone or preferably in combination with a humectant, such as glycerine or glycol. Such conversion solutions have also often included buffers for proper pH adjustment, such as monobasic ammonium phosphate or sodium phosphate and phosphoric acid.

It has been found that the ferrocyanide is subject to oxidation and/or dissociation, especially in response to exposure to light, to yield an equilibrium between $Fe(CN)_6^{4-}$ and $Fe(CN)_6^{3-}$ ions with small amounts of $Fe^{++}$ and $Fe^{+++}$ being present. The ions combine to form Prussian Blue which discolors the solution and precipitates to enable further dissociation in maintenance of the equilibrium thereby to propagate the precipitation with corresponding depreciation of the active ingredient. Other discoloration and precipitations result from the oxidation of ferrocyanide to ferricyanide and/or to the formation of a brown complex of ferric ferricyanide. Thus, the conversion solution becomes less and less effective until it becomes totally ineffective for use, i.e., the ability to react with zinc oxide to render the non-imaged portions hydrophilic. Evidence of such deterioration occurs within hours of preparation such that conversion solutions of the type presently marketed are characterized by very poor shelf life.

It is an object of this invention to provide a new and improved conversion solution which does not deteriorate upon standing or upon exposure, which remains effective for conversion of the non-imaged portions of the zinc oxide coated electrophotographic master to water receptive, hydrophilic portions, which provides the desired balance between increased ink receptivity of the imaged portions and ink repellency and water receptivity of the non-imaged portions, which is easy to apply and use, and which has good shelf life for use as an etch or conversion solution with planographic or offset electrophotographic printing plates.

The concepts of this invention are embodied in a conversion solution based upon the continued use of potassium ferrocyanide in solution but which is formulated to contain a chelating agent capable of sequestering the ions of $Fe^{++}$ and $Fe^{+++}$ when present in the solution. Thus, the $Fe^{++}$ and $Fe^{+++}$ ions are inactivated while being retained within the system to maintain the desired equilibrium which retards the precipitation of insoluble complex salts. In the absence of the sequestering of the ions of $Fe^{++}$ and $Fe^{+++}$, the ions become removed from the system by formation of the described precipitate thereby to shift the equilibrium in the direction to cause progressive dissociation of additional amounts of ferrocyanide for replacement of the removed ions. This ultimately leads to the removal of sufficient ferrocyanide to render the solution ineffective. In the presence of the described sequestering or chelating agents, the ions are retained to maintain the equilibrium and thereby retard the deterioration of the solution.

As the chelating agent capable of sequestering the free ions of $Fe^{++}$ and $Fe^{+++}$, use can be made of amino carboxylic acids and their water-soluble salts and derivatives thereof and preferably the diamines of acetic or oxalic acids and their salts and derivatives thereof, such as ethylene diamine tetraacetate or sodium salts thereof, diethylene triamine pentaacetic acid or sodium salts thereof, or other suitable chelating agents capable of use for sequestering the ions $Fe^{++}$ and $Fe^{+++}$ as described on pages 70–117 of the publication entitled "Sequestration of Metals" by Robert Z. Smith, published by Chapman-Hall of London, England (1959).

It is sufficient to make use of minor amounts of the chelating agent in the ferrocyanide conversion solution within the range of 0.1% to 1% by weight, but it is preferred to make use of an amount within the range of 0.05% to 0.15% by weight of the solution. When the amount of chelating agent exceeds 1% by weight, the danger arises that the solution will have an undesirable blinding effect on the image.

A conversion solution embodying the features of this invention is formulated to include potassium ferrocyanide in solution, with or without a humectant, and preferably with a buffering agent present in an amount to maintain the solution at a pH below 7. Such solutions remain clear and substantially free of discoloration, such as the blue discoloration characteristic of the formation of ferric-ferrocyanide complexes. The solution is capable of better performance over a longer period of time to provide a master from which better copy can be produced.

Having described the basic concepts of this invention, illustration will now be made by reference to the following examples which are given by way of illustration, but not by way of limitation.

EXAMPLE 1

|  | Percent by weight |
|---|---|
| Monobasic ammonium phosphate | 8 |
| Potassium ferrocyanide | 2 |
| Glycerol | 15 |
| Deionized water | 74.9 |
| Disodium ethylenediamine tetraacetate | 0.1 |

The pH of the foregoing conversion solution will be between 4 and 5.

EXAMPLE 2

|  | Percent by weight |
|---|---|
| Monobasic ammonium phosphate | 5 |
| Potassium ferrocyanide | 3 |
| Disodium diethylenetriamine pentaacetate | 0.15 |
| Water | 91.8 |

EXAMPLE 3

|  | Percent by weight |
|---|---|
| Monobasic ammonium phosphate | 7 |
| Potassium ferrocyanide | 2 |
| Glycol | 15 |
| Disodium ethylenediamine tetraacetate | 0.1 |
| Water | 75.9 |

Ordinarily the conversion solution will be formulated with the buffering agent, such as the monobasic ammonium phosphate, to maintain the pH to below 7 although a buffering agent is not essential. Similarly, it is preferred to formulate the conversion solution with a humectant, such as a polyol-like glycerol or glycol, but again the humectant is not essential and a good conversion solution can be formulated without a humectant and/or without a buffer.

The conversion solution is applied onto the surface of the imaged plate by means of a cotton pad or other means for swabbing the surface or wetting the surface. Instead, the conversion solution can be applied to the surface of the plate as a pre-etch after the plate has been mounted in the duplicating machine.

It will be understood that changes may be made in the details of formulation and method of application without departing from the spirit of the invention, especially as defined in the following claims.

I claim:
1. In the process for the treatment of a zinc oxide coated electrophotographic planographic master with a conversion solution containing a ferrocyanide to convert non-imaged portions of the master to a desired water-receptive, ink-repellent condition, the improvement comprising contacting said master with a conversion solution containing a ferrocyanide and up to 1% by weight of a chelating agent capable of sequestering $Fe^{++}$ and $Fe^{+++}$ ions, selected from the group consisting of aminocarboxylic acids, their ester derivatives and salts thereof.

2. A process as defined in claim 1 in which the $Fe^{++}$ and $Fe^{+++}$ sequestered by the chelating agent results from the equilibrium reaction of the ferrocyanide in solution.

3. A process as defined in claim 1 in which the chelating agent is present in the solution in an amount within the range of 0.1 to 1.0% by weight.

4. A process as defined in claim 1 in which the chelating agent is present in the solution in an amount within the range of 0.05 to 0.15% by weight.

5. A process as defined in claim 1 in which the chelating agent is selected from the group consisting of amino carboxylic acids and derivatives thereof and their soluble salts.

6. A process as defined in claim 1 in which the chelating agent is selected from the group consisting of diamines of acetic acid and oxalic acid and their salts and derivatives thereof.

7. A process as defined in claim 1 in which the chelating agent is selected from the group consisting of ethylenedimaine tetraacetate and its alkali metal salts, ethylenetriamine pentaacetate and its alkali metal salts.

8. A process as defined in claim 1 which includes a buffer in an amount to adjust the pH to below 7.

9. A process as defined in claim 1 which includes a humectant in the form of a soluble polyol.

References Cited
UNITED STATES PATENTS

| 3,573,041 | 3/1971 | Van Engeland et al. | 96—1 |
| 3,309,990 | 3/1967 | Klüpfel et al. | 96—1 X |
| 3,272,121 | 9/1966 | Uber et al. | 101—465 X |

GEORGE F. LESMES, Primary Examiner

J. R. MILLER, Assistant Examiner

U.S. Cl. X.R.

96—1.8, 33; 101—465